(12) United States Patent
Wang et al.

(10) Patent No.: US 11,854,466 B2
(45) Date of Patent: Dec. 26, 2023

(54) DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Xuanyun Wang, Wuhan (CN); Chao Dai, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 319 days.

(21) Appl. No.: 17/286,457

(22) PCT Filed: Jan. 28, 2021

(86) PCT No.: PCT/CN2021/074078
§ 371 (c)(1),
(2) Date: Apr. 17, 2021

(87) PCT Pub. No.: WO2022/147862
PCT Pub. Date: Jul. 14, 2022

(65) Prior Publication Data
US 2023/0154384 A1 May 18, 2023

(30) Foreign Application Priority Data
Jan. 8, 2021 (CN) .......................... 202110023885.7

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0297* (2013.01)

(58) Field of Classification Search
CPC ............. G09G 2310/0297; G09G 3/32; G09G 2300/0842; G09G 2310/0267
See application file for complete search history.

(56) References Cited

U.S. PATENT DOCUMENTS

2016/0148556 A1* 5/2016 Tseng .................. G09G 3/3677
345/55
2016/0217744 A1 7/2016 Song et al.
(Continued)

FOREIGN PATENT DOCUMENTS

CN 103198867 A 7/2013
CN 104282285 A 1/2015
(Continued)

*Primary Examiner* — Muhammad N Edun
(74) *Attorney, Agent, or Firm* — PV IP PC; Wei Te Chung; Zhigang Ma (57) ABSTRACT

The present application discloses a display panel and a display device. The display panel includes a GOA circuit, a source driving chip, a multiplexing circuit, and a plurality of pixels distributed in an array; through improvement of the cascade connection between GOA units and the at least partially overlapping between working cycles of adjacent ones of the GOA units, more working cycles can be provided for the writing of the data signals to meet the writing requirements of the data signals during high-frequency drive display or ultra-high frequency drive display.

16 Claims, 9 Drawing Sheets

(56) References Cited

U.S. PATENT DOCUMENTS

| | | | | |
|---|---|---|---|---|
| 2018/0108300 A1* | 4/2018 | Zhao | ................... | G11C 19/28 |
| 2019/0197978 A1* | 6/2019 | Wu | ................... | G09G 3/3677 |
| 2020/0410939 A1* | 12/2020 | Li | ................... | G09G 3/3266 |

FOREIGN PATENT DOCUMENTS

| CN | 105336300 A | 2/2016 |
|---|---|---|
| CN | 110148384 A | 8/2019 |
| KR | 100666646 B1 | 1/2007 |

* cited by examiner

DISPLAY PANEL AND DISPLAY DEVICE

RELATED APPLICATIONS

This application is a Notional Phase of PCT Patent Application No. PCT/CN2021/074078 having international filing date of Jan. 28, 2021, which claims the benefit of priority of Chinese Patent Application Nos. 202110023885.7 filed on Jan. 8, 2021. The contents of the above applications are all incorporated by reference as if fully set forth herein in their entirety.

BACKGROUND OF INVENTION

Field of Invention

This application relates to the field of display technology, in particular to a display panel and a display device.

Description of Prior Art

With the development of multimedia, display devices have become more and more important. Correspondingly, the requirements for various types of display devices are getting higher and higher, and especially in the field of smart phones, high-frequency drive displays, ultra-high-frequency drive displays, low-power drive displays, low-frequency drive displays, and ultra-low-frequency drive displays will become the development demand direction at present and in the future.

The display panel in the traditional technical solution generally cannot meet the requirements of the high-frequency drive display or the ultra-high frequency drive display, mainly because it cannot meet the writing requirements of the data signals during the high-frequency drive display or the ultra-high frequency drive display.

SUMMARY OF INVENTION

The present application provides a display panel and a display device, which solves the problem of being unable to meet the writing requirements of data signals during high-frequency drive display or ultra-high-frequency drive display.

In a first aspect, the present application provides a display panel, which includes a GOA circuit, a source driving chip, a multiplexing circuit, and a plurality of pixels distributed in an array; the GOA circuit includes N numbers of cascaded GOA units, and an Nth-level one of the GOA units is cascaded with an N+X-level one of the GOA units; the source driving chip has a plurality of output pins; the multiplexing circuit includes a plurality of multiplexing units, wherein each of the multiplexing units includes an input terminal, a first output terminal, and a second output terminal, and one of the output pins is correspondingly connected to the input terminal; the first output terminal is correspondingly connected to odd-numbered rows of the pixels in a same column, and the second output terminal is correspondingly connected to even-numbered rows of the pixels in a same column; N and X are both integers greater than or equal to 2; and working cycles of adjacent ones of the GOA units at least partially overlap.

Based on the first aspect, in a first embodiment of the first aspect, there is a first interval cycle between a working cycle of the Nth-level one of the GOA units and a working cycle of an N+2-level one of the GOA units.

Based on the first embodiment of the first aspect, in a second embodiment of the first aspect, each of the multiplexing units includes a first transistor and a second transistor; there is a second interval cycle between a working cycle of the first transistor and a working cycle of the second transistor; and the working cycle of the first transistor, the second interval cycle, and the working cycle of the second transistor are in a same working cycle of one of the GOA units.

Based on the second embodiment of the first aspect, in a third embodiment of the first aspect, the first interval cycle is different from the second interval cycle.

Based on the third embodiment of the first aspect, in a fourth embodiment of the first aspect, the pixels include: a driving transistor; a first transistor, wherein one of a source and a drain of the first transistor is connected to a gate of the driving transistor, and the gate of the first transistor is connected to a first control signal; and a second transistor, wherein one of a source and a drain of the second transistor is connected to another of the source and the drain of the first transistor, the another of the source and the drain of the second transistor is connected to one of the source and the drain of the driving transistor, and the gate of the second transistor is connected to a second control signal, wherein the driving transistor is a polysilicon thin film transistor, and the first transistor and the second transistor are both oxide thin film transistors.

Based on the fourth embodiment of the first aspect, in a fifth embodiment of the first aspect, the pixels further include: a third transistor, wherein one of a source and a drain of the third transistor is connected to an initialization signal, another of the source and the drain of the third transistor is connected to one of the source and the drain of the second transistor, and a gate of the third transistor is connected to a third control signal.

Based on the fifth embodiment of the first aspect, in a sixth embodiment of the first aspect, the pixels further include: a first light-emitting control transistor, wherein one of a source and a drain of the first light-emitting control transistor is connected to a first power signal, another of the source and the drain of the first light-emitting control transistor is connected to another of the source and the drain of the driving transistor, and a gate of the first light-emitting control transistor is connected to the light-emitting control signal; and a second light-emitting control transistor, wherein one of a source and a drain of the second light-emitting control transistor is connected to one of the source and the drain of the driving transistor, and a gate of the second light-emitting control transistor is connected to the light-emitting control signal.

Based on the sixth embodiment of the first aspect, in a seventh embodiment of the first aspect, the pixels further include: a reset transistor, wherein one of a source and a drain of the reset transistor is connected to another of the source and the drain of the second light-emitting control transistor, another of the source and the drain of the reset transistor is connected to the initialization signal or another of the source and the drain of the third transistor, and a gate of the reset transistor is connected to the third control signal or a data writing control signal.

Based on the seventh embodiment of the first aspect, in an eighth embodiment of the first aspect, the pixels further include: a writing transistor, wherein one of a source and a drain of the writing transistor is connected to a data signal, another of the source and the drain of the writing transistor is connected to another of the source and the drain of the driving transistor, and a gate of the writing transistor is connected to the data writing control signal.

In a second aspect, the present application provides a display device, which includes the display panel in any one of the foregoing embodiments.

In the display panel provided in this embodiment, through improvement of the cascade connection between GOA units and the at least partially overlapping between working cycles of adjacent ones of the GOA units, more working cycles can be provided for the writing of the data signals to meet the writing requirements of the data signals during high-frequency drive display or ultra-high frequency drive display.

DETAILED DESCRIPTION OF PREFERRED EMBODIMENTS

In order to make the purpose, technical solutions and effects of this application clearer and clearer, the following further describes this application in detail with reference to the drawings and examples. It should be understood that the specific embodiments described here are only used to explain the application, and not used to limit the application.

Figure 1:
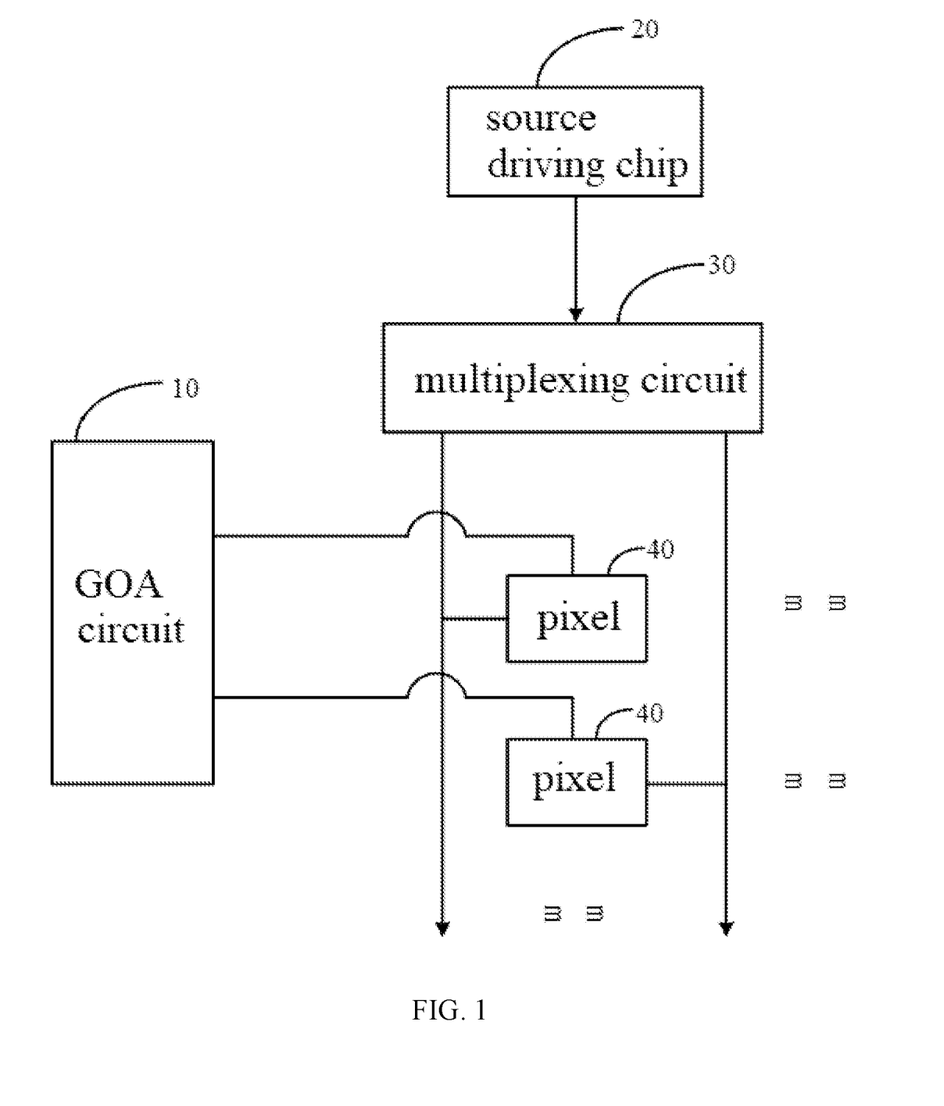
FIG. 1 is a schematic diagram of a first structure of a display panel provided by an embodiment of the application.
Figure 2:
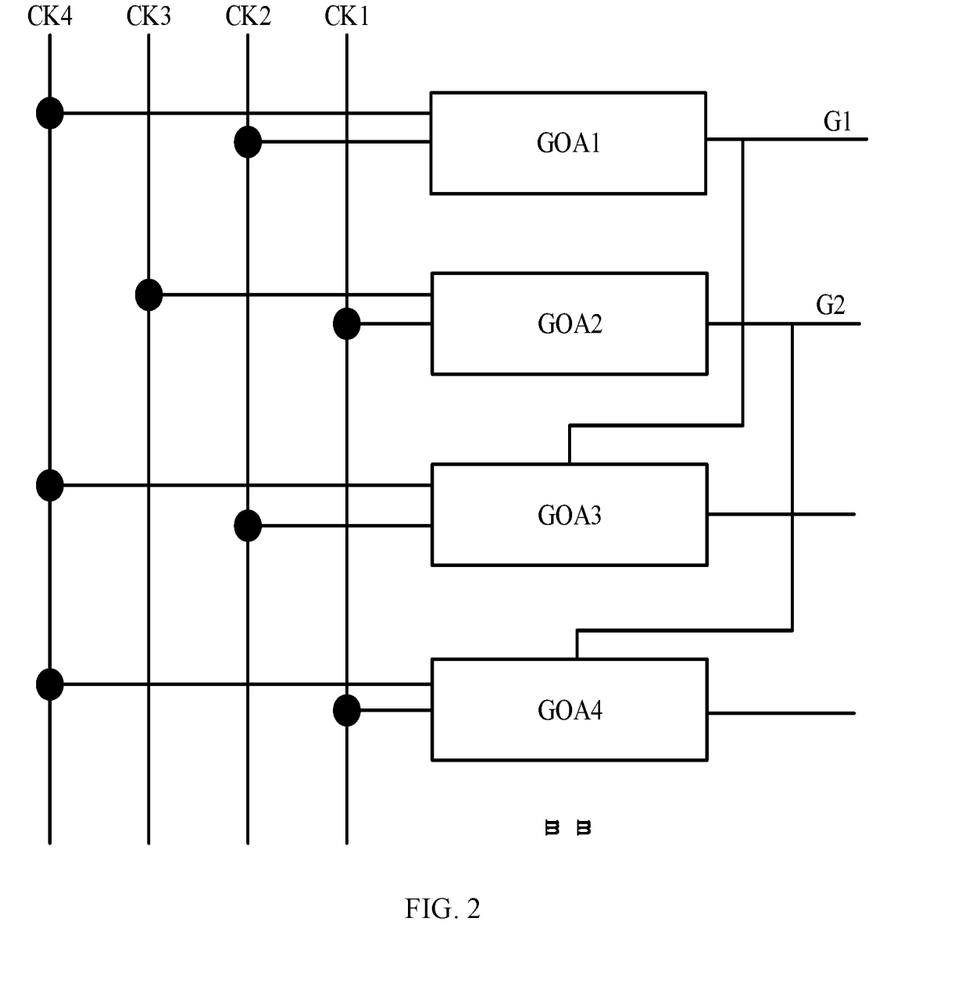
FIG. 2 is a schematic structural diagram of a GOA circuit provided by an embodiment of the application.

Referring to FIGS. 1-9, as shown in FIG. 1, the present embodiment provides a display panel, which includes a GOA circuit 10, a source driving chip 20, a multiplexing circuit 30, and a plurality of pixels 40 distributed in an array. The GOA circuit 10 includes N numbers of cascaded GOA units, and an Nth-level one of the GOA units is cascaded with the N+X-level GOA unit one of the GOA units; the source driving chip 20 has a plurality of output pins; the multiplexing circuit 30 includes a plurality of multiplexing units, wherein each of the multiplexing units includes an input terminal, a first output terminal, and a second output terminal, and one of the output pins is correspondingly connected to the input terminal; the first output terminal is correspondingly connected to odd-numbered rows of the pixels 40 in a same column, and the second output terminal is correspondingly connected to even-numbered rows of the pixels 40 in a same column; wherein N and X are both integers greater than or equal to 2; and working cycles of adjacent ones of the GOA units at least partially overlap. As shown in FIG. 2, the display panel is provided with a display area and a non-display area located on at least one side of the display area, the GOA circuit 10 is disposed in the non-display area on one side, and each GOA unit in the GOA circuit 10 is cascaded in a single row, wherein the odd-numbered GOA units are sequentially cascaded, and for example, a first scan signal G1 output by the first-level GOA unit GOA1 is also used as an input signal of the third-level GOA unit GOA3; the even-numbered GOA units are sequentially cascaded, and for example, a second scan signal G2 output by the second-level GOA unit GOA2 is used as an input signal of the fourth-level GOA unit GOA4 at the same time. A plurality of clock signal lines parallel to each other are provided on a side of the GOA circuit 10 far away from the display area. The first clock signal line CK1, the second clock signal line CK2, the third clock signal line CK3, and the fourth clock signal line CK4 are arranged in sequence from the nearer to the farthest from the GOA circuit 10. The first clock signal line CK1 is connected to the second-level GOA unit GOA2 and the fourth-level GOA unit GOA4, the second clock signal line CK2 is connected to the first-level GOA unit GOA1 and the third-level GOA unit GOA3, the third clock signal line CK3 is connected to the second-level GOA unit GOA2 and the fourth-level GOA unit GOA4, and the fourth clock signal line CK4 is connected to the first-level GOA unit GOA1 and the third-level GOA unit GOA3.

It is understandable that in the display panel provided in this embodiment, through improvement of the cascade connection between GOA units and the at least partially overlapping between working cycles of adjacent ones of the GOA units, more working cycles can be provided for the writing of the data signals to meet the writing requirements of the data signals during high-frequency drive display or ultra-high frequency drive display.

An active driving chip 20 and a multiplexing circuit 30 are also provided in the non-display area on the other side of the display panel. An output terminal of the source driving chip 20 is connected to the input terminal of the multiplexing circuit 30 correspondingly, a control terminal of the multiplexing circuit 30 is connected to a strobe signal correspondingly, and an output terminal of the multiplexing circuit 30 is connected to the data line. The multiplexing circuit 30 includes a plurality of multiplexing units; an input terminal of each multiplexing unit is connected to an output terminal of the source driving chip 20, and each multiplexing unit includes at least two output terminals. One output terminal of the multiplexing unit is correspondingly connected to one data line.

Figure 3:
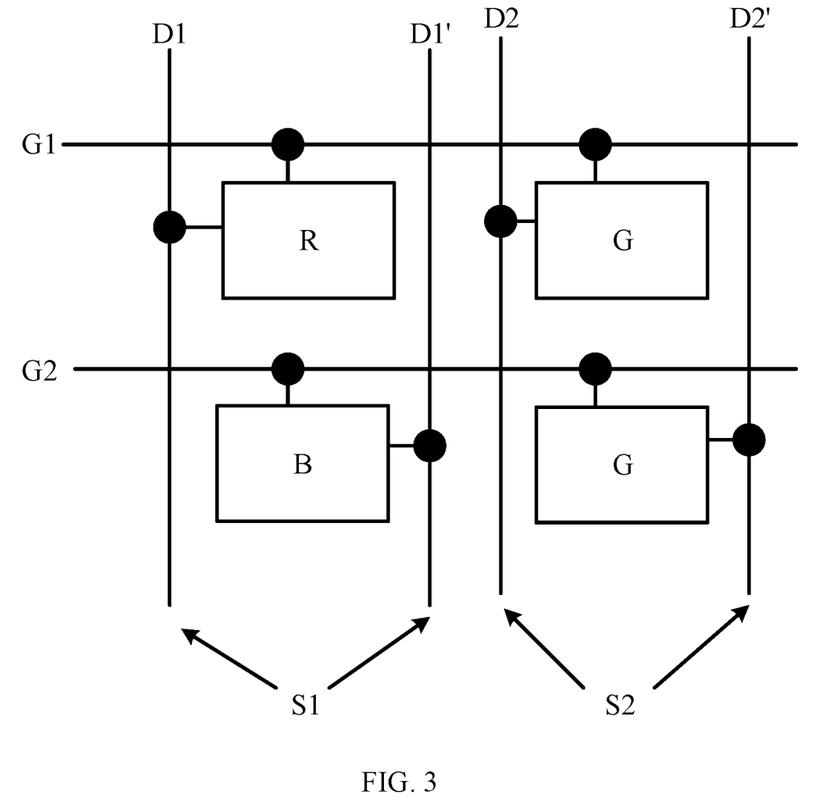
FIG. 3 is a schematic diagram of a second structure of a display panel provided by an embodiment of the application.

As shown in FIG. 3, a plurality of pixels 40, a plurality of scan lines, and a plurality of data lines are distributed in an array in the display area, and the plurality of scan lines and the plurality of data lines are perpendicular to and cross each other, thereby dividing a plurality of pixels 40. Each scan line corresponds to a scan signal to simultaneously control the charging of the pixels 40 in the same row; wherein, a data line is distributed on each of opposite sides of the pixel 40 in the same column, the data line on one side is connected to the odd-numbered rows of the pixels 40 in the same column, and the data line on another side is connected to the even-numbered rows of the pixels 40 in the same column. Two data lines are provided between the pixels 40 in adjacent ones of the columns, one of the data lines is connected to the even-numbered rows of pixels 40 of one column of the pixels 40, and another one of the data lines is connected to the odd-numbered rows of pixels 40 of another column of the pixels 40. For example, the first data signal S1 and the second data signal S2 are correspondingly output from two pins of the source driving chip 20, wherein the first data signal S1 outputs the first data sub-signal and the second data sub-signal after passing through the first multiplexing unit, the first data sub-signal is connected to odd-numbered rows of the pixels 40 in the same column, and the second data sub-signal is connected to even-numbered rows of the pixels 40 in the same column; the second data signal S2 outputs the third data sub-signal and the fourth data sub-signal after passing through the second multiplexing unit, the third data sub-signal is connected to the odd-numbered row of pixels 40 in another same column, and the fourth data sub-signal is connected to the even-numbered row of pixel 40 in the another same column. The first data sub-signal, the second data sub-signal, the third data sub-signal, and the fourth data sub-signal are sequentially transmitted to the first data line D1, the second data line D1', the third data line D2, and the fourth data line D2' which are adjacent and arranged sequentially.

Figure 4:
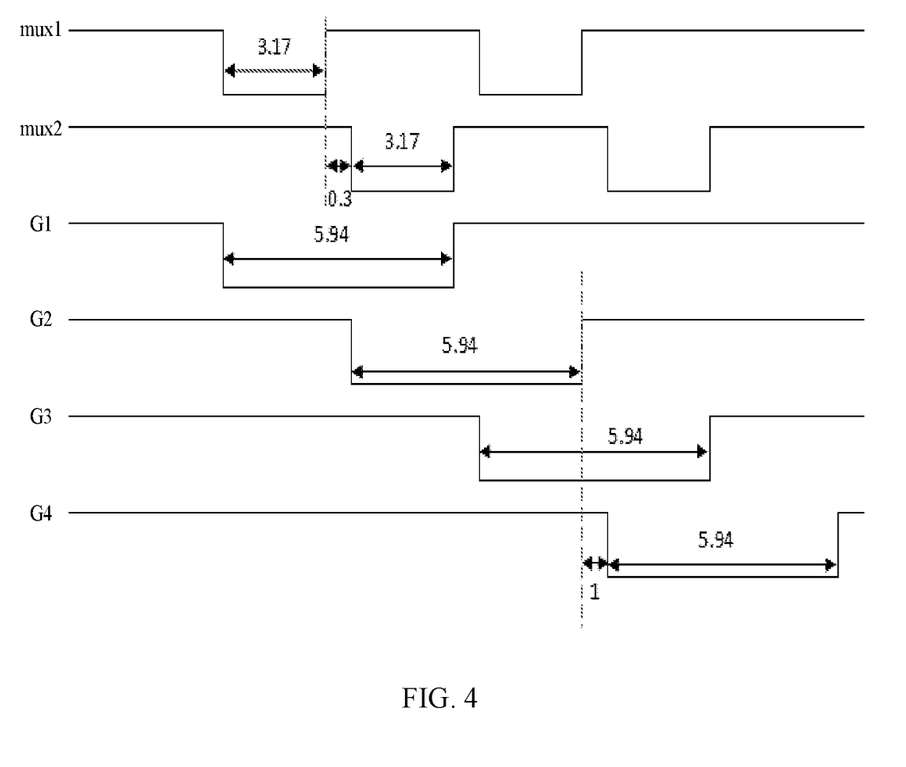
FIG. 4 is a timing diagram of corresponding signals in the display panel provided by an embodiment of the application.

It should be noted that the multiplexing unit may include a first transistor and a second transistor; there is a second interval cycle between the working cycle of the first transistor and the working cycle of the second transistor. As shown in FIG. 4, the working cycle of the first transistor, the second interval cycle, and the working cycle of the second transistor are in the same working cycle of the GOA unit. The second interval cycle can ensure that the two transistors in the same multiplexing unit perform orderly and time-sharing operations, and avoid cross-working which causes timing confusion. The second interval cycle is greater than or equal to 0.3 microseconds. The working cycle of the first transistor may be, but is not particularly limited to, the same as the working cycle of the second transistor. For example, the working cycle of the first transistor or the working cycle of the second transistor may be 3.17 microseconds.

It should be noted that the working cycle of the corresponding transistor is the effective-level duration of the corresponding strobe signal, and for example, it can be a high-level duration or a low-level duration which is defined as being effective as long as it can turn on the corresponding transistor.

The pixels may include, but are not particularly limited to, red pixels R, green pixels G, and blue pixels B, and may also include white pixels.

As shown in FIG. 4, in one of the embodiments, the first multiplexing unit includes a first thin film transistor and a second thin film transistor of a P-channel type; wherein, the first data signal S1 is connected to the input terminal of the first thin film transistor and the input terminal of the second thin film transistor, the output terminal of the first thin film transistor is connected to the first data line D1, the output terminal of the second thin film transistor is connected to the second data line D1', the control terminal of the first thin film transistor is connected to the first strobe signal mux1, and the control terminal of the second thin film transistor is connected to the second strobe signal mux2. The effective-level duration of each of the first strobe signal mux1 and the second strobe signal mux2, for example, may be but not particularly limited to a low-level duration, which may be 3.17 microseconds; and a time interval between the rising edge of the first strobe signal mux1 and the falling edge of the second strobe signal mux2 is not more than 0.3 microseconds. Correspondingly, the first data line D1 and the second data line D1' will output the corresponding first data sub-signal and second data sub-signal during the effective-level duration.

The effective-level duration of each of the first scan signal G1, the second scan signal G2, the third scan signal G3, and the fourth scan signal G4 can be, but is not particularly limited to, a low-level duration, which can be 5.94 microseconds, and the time interval between the rising edge of a first scan signal G1 and the falling edge of the third scan signal G3 is not more than 1 microsecond, and the time interval between the rising edge of the second scan signal G2 and the falling edge of the fourth scan signal G4 is not greater than 1 microsecond; the effective-level durations of adjacent first scan signal G1, second scan signal G2, third scan signal G3, and fourth scan signal G4 sequentially overlap at least partially. Further, the effective-level duration of the first scan signal G1 at least partially overlaps the effective-level duration of the first strobe signal mux1 and/or the effective-level duration of the second strobe signal mux2.

It should be noted that there is a first interval cycle between a working cycle of the Nth-level one of the GOA units and a working cycle of an N+X-level one of the GOA units, to avoid overlapping of the working cycles between the separated GOA units, which causes timing confusion. X can be, but not particularly limited to 2, and can also be 3 or 4. The first interval cycle may be greater than or equal to 1 microsecond. The working cycle of the Nth-level one of the GOA units may be greater than or equal to 5.94 microseconds.

It should be noted that the working cycle of the N-th GOA unit is the effective-level duration corresponding to the scan signal, and for example, it can be a high-level duration or a low-level duration, which is defined as being effective as long as it can turn on the corresponding transistor.

It is understandable that the data writing control signal in this embodiment can be, but is not particularly limited to, the corresponding scan signal output by the GOA circuit; the data signal in this embodiment is directly written into the pixel in the display area, and the effective-level duration cycle of the data signal may be, but not particularly limited to, consistent with the effective-level duration cycle of the corresponding strobe signal. Obviously, the effective-level duration cycle of the data writing control signals in this embodiment, that is, the effective-level of the scan signal and the data signal lasts, can better improve the writing ability of the data signal.

Figure 5:
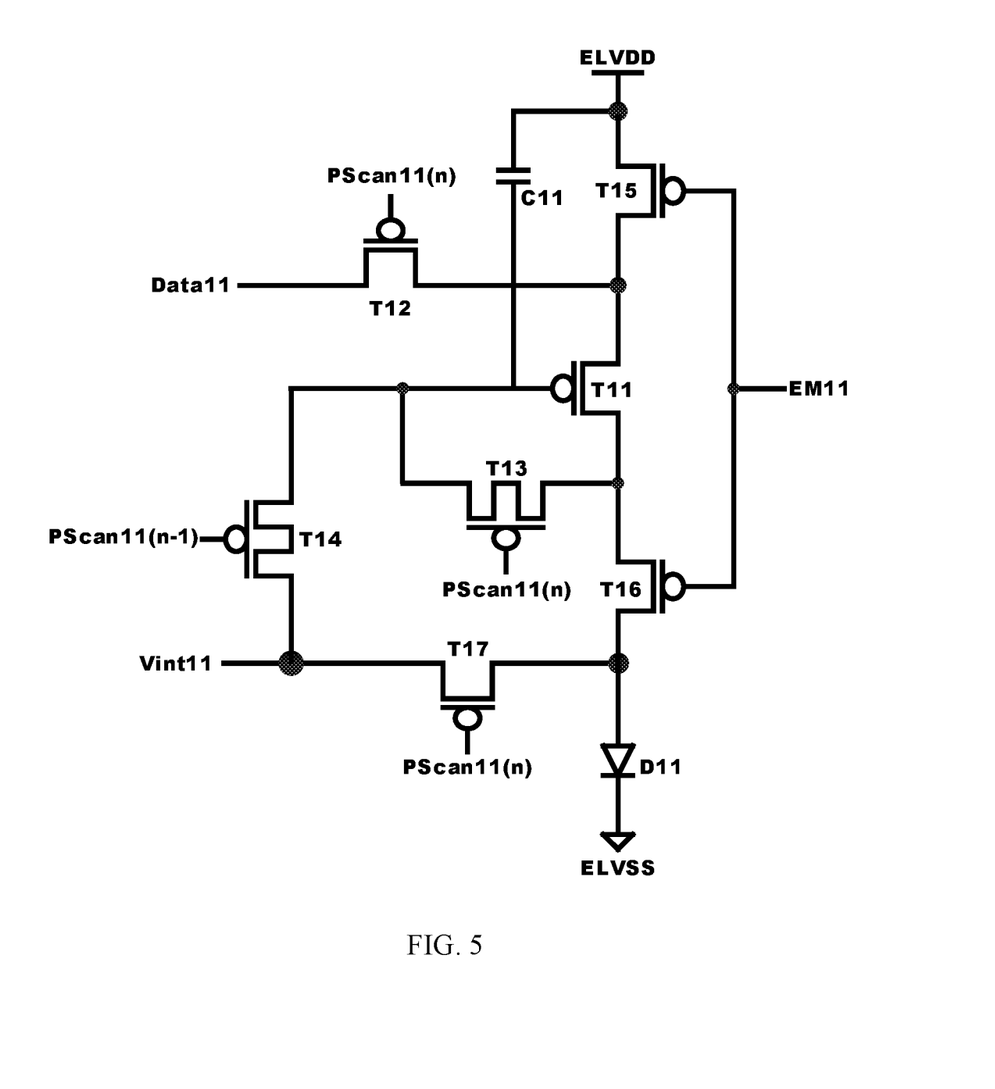
FIG. 5 is a schematic diagram of a first circuit structure of a pixel provided by an embodiment of the application.

As shown in FIG. 5, in one of the embodiments, the pixels can be configured as follows:

The first power signal ELVDD is connected to one of the first terminal of the storage capacitor C11 and one of a source and a drain of the first light-emitting control transistor T15; another of the source and the drain of the first light-emitting control transistor T15 is connected to one of the source and the drain of the transistor T12 is connected to one of the source and the drain of the driving transistor T11; another of the source and the drain of the writing transistor T12 is connected to the data signal data11; a gate of the writing transistor T12 is connected to the data writing control signal PScan11(n); another of the source and the drain of the driving transistor T11 is connected to one of the source and the drain of the second light-emitting control transistor T16 and one of the source and the drain of the compensation transistor T13. Another of the source and the drain of the second light-emitting control transistor T16 is connected to the anode of the light-emitting device D11; the light-emitting control signal EM11 is connected to the gate of the first light-emitting control transistor T15 and the gate of the second light-emitting control transistor T16; the cathode of the light-emitting device D11 is connected to the second power signal ELVSS; another of the source and the drain of the compensation transistor T13 is connected to the second terminal of the storage capacitor C11, the gate of the driving transistor T11, and one of the source and the drain of the initialization transistor T14. Another of the source and the drain of the initialization transistor T14 is connected to the initialization signal Vint11 and one of the source and the drain of the reset transistor T17; another of the source and the drain of the reset transistor T17 is connected to the anode of the light-emitting device D11; the first control signal is connected to the gate of the compensation transistor T13 and the gate of the reset transistor T17; the second control signal is connected to the gate of the initialization transistor T14; wherein, the first control signal can be, but is not particularly limited to, data writing control signal PScan11($n$); and the second control signal can be, but is not particularly limited to, the data writing control signal PScan11($n$−1).

It should be noted that in this embodiment, each of the first light-emitting control transistor T15, the writing transistor T12, the driving transistor T11, the compensation transistor T13, the second light-emitting control transistor T16, the initialization transistor T14, and the reset transistor T17 may be, but not particularly limited to, a P-channel thin film transistor, and can also be a polysilicon thin film transistor, and further can be configured as a low temperature polysilicon thin film transistor.

The compensation transistor T13 can also be configured as two P-channel type low temperature polysilicon thin film transistors connected in series, the gates of the two thin film transistors are connected; the source of one of the thin film transistors and the drain of the other one of the thin film transistors are connected. The initialization transistor T14 can be, but is not particularly limited to, configured to have the same structure as the compensation transistor T13, which will not be repeated herein for brevity.

It can be understood that the increase in the duty cycle of the data signal Data11, the data writing control signal PScan11($n$), and the data writing control signal PScan11($n$−1) in this embodiment can not only increase the writing ability of the data signal Data11, but also simultaneously increase the reset time of the light-emitting device D11 and the initialization time of the gate potential of the driving transistor T11, which is beneficial for the display panel to realize the high frequency display state or the ultra high frequency display state.

Figure 6:
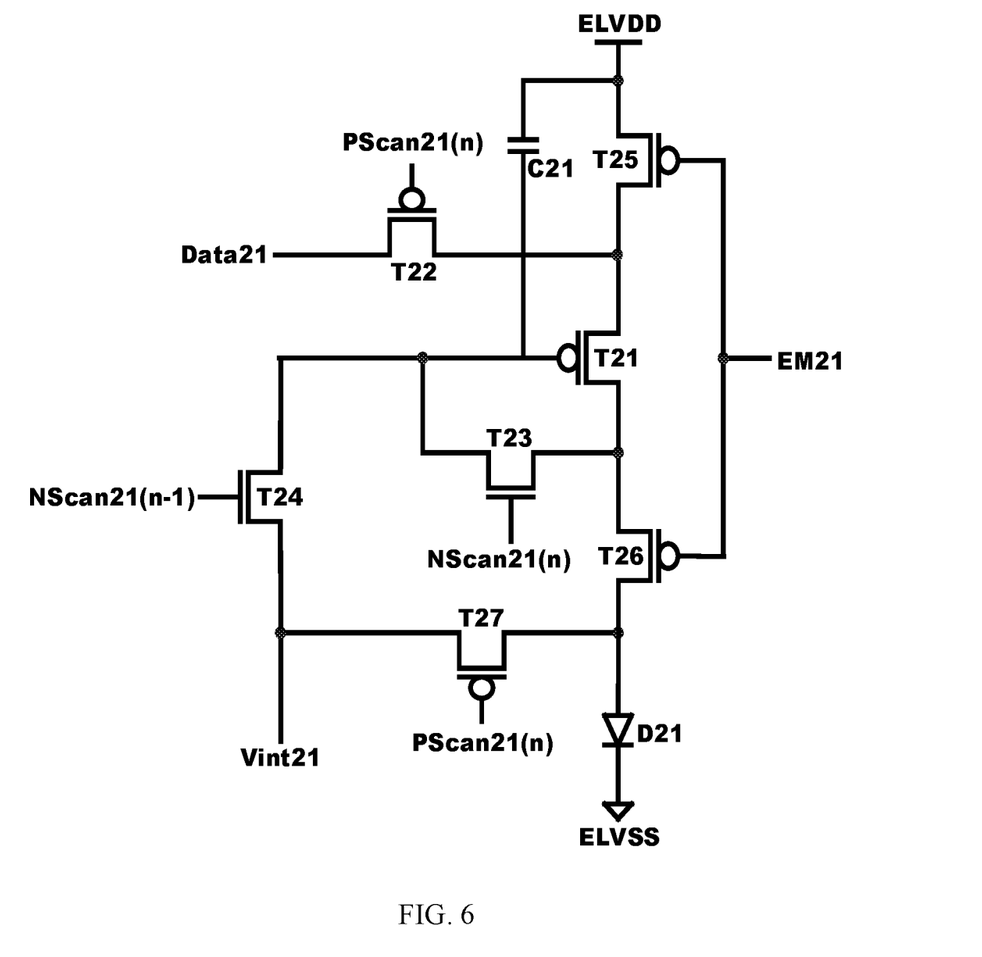
FIG. 6 is a schematic diagram of a second circuit structure of a pixel provided by an embodiment of the application.

As shown in FIG. 6, in one of the embodiments, the pixels can also be configured as follows:

The first power signal ELVDD is connected to one of the first terminal of the storage capacitor C21 and one of a source and a drain of the first light-emitting control transistor T25; another of the source and the drain of the first light-emitting control transistor T25 is connected to one of the source and the drain of the transistor T22 is connected to one of the source and the drain of the driving transistor T21; another of the source and the drain of the writing transistor T22 is connected to the data signal data2$l$; a gate of the writing transistor T22 is connected to the data writing control signal PScan21($n$); another of the source and the drain of the driving transistor T21 is connected to one of the source and the drain of the second light-emitting control transistor T26 and one of the source and the drain of the compensation transistor T23. Another of the source and the drain of the second light-emitting control transistor T26 is connected to the anode of the light-emitting device D21; the light-emitting control signal EM21 is connected to the gate of the first light-emitting control transistor T25 and the gate of the second light-emitting control transistor T26; the cathode of the light-emitting device D21 is connected to the second power signal ELVSS; another of the source and the drain of the compensation transistor T23 is connected to the second terminal of the storage capacitor C21, the gate of the driving transistor T21, and one of the source and the drain of the initialization transistor T24; another of the source and the drain of the initialization transistor T24 is connected to the initialization signal Vint21 and one of the source and the drain of the reset transistor T27. Another of the source and the drain of the reset transistor T27 is connected to the anode of the light emitting device D21; the first control signal is connected to the gate of the compensation transistor T23 and the gate of the reset transistor T27; the second control signal is connected to the gate of the initialization transistor T24; wherein, the first control signal can be, but is not particularly limited to, data writing control signal PScan11($n$); and the second control signal can be, but is not particularly limited to, the data writing control signal PScan11($n$−1).

It should be noted that in this embodiment, each of the first light-emitting control transistor T25, the writing transistor T22, the driving transistor T21, the second light-emitting control transistor T26, and the reset transistor T27 may be, but are not particularly limited to, a P-channel thin film transistor, and can also be a polysilicon thin film transistor, and further can be configured as a low temperature polysilicon thin film transistor. The compensation transistor T23 and the initialization transistor T24 can be, but are not particularly limited to, both N-channel thin film transistors, or oxide thin film transistors, and further can be configured as metal oxide thin film transistors. It can be understood that the compensation transistor T23 and the initialization transistor T24 in this embodiment are configured as oxide thin film transistors, which can further reduce the gate leakage current of the driving transistor T21, more conducive to reducing the pixel of this embodiment to achieve low power consumption and the display status of different frequencies.

Meanwhile, the increase in the duty cycle of the data signal Data21, the data writing control signal PScan21($n$), the first control signal, and the second control signal in this embodiment can not only improve the writing ability of the data signal Data21, but also can increases the reset time of the light-emitting device D21 and the initialization time of the gate potential of the driving transistor T21, which are more beneficial for the display panel to realize the high frequency display state or the ultra high frequency display state.

Figure 7:
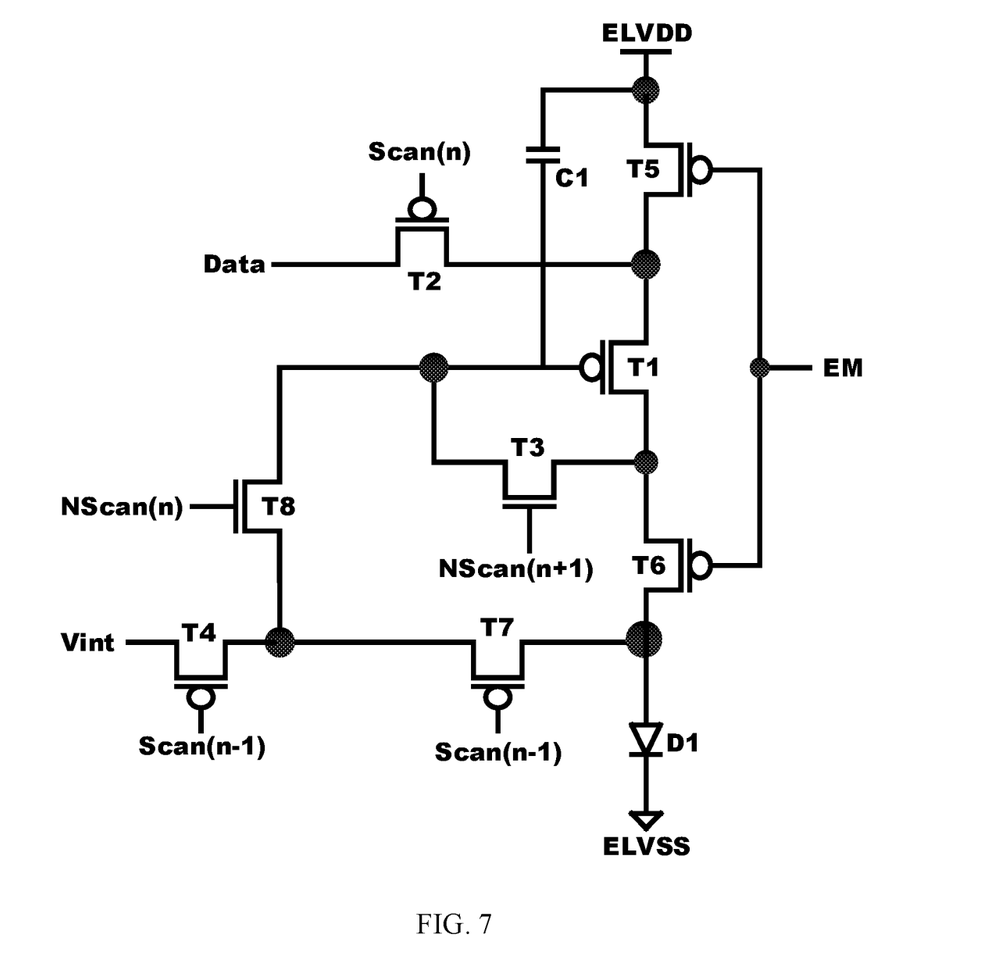
FIG. 7 is a schematic diagram of a third circuit structure of a pixel provided by an embodiment of the application.
Figure 8:
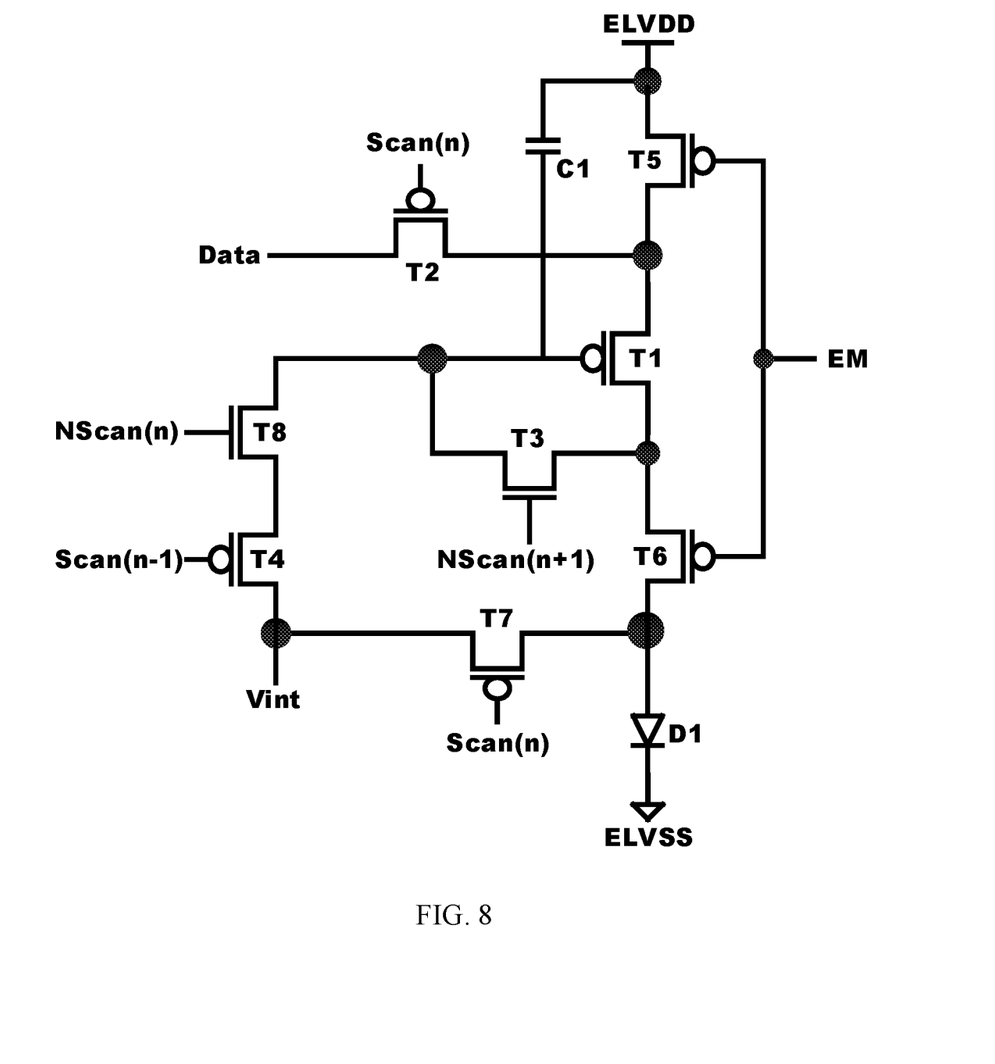
FIG. 8 is a schematic diagram of a fourth circuit structure of a pixel provided by an embodiment of the application.

As shown in FIGS. 7 and 8, in one of the embodiments, the pixel may also be configured to include a driving transistor T1, a first transistor T3, and a second transistor T8; one of the source and the drain of the first transistor T3 is connected to the gate of the driving transistor T1, the gate of the first transistor T3 is connected to the first control signal; and one of the source and the drain of the second transistor T8 is connected to another one of the source and the drain of the first transistor T3; another of the source and the drain of the second transistor T8 is connected to one of the source and the drain of the driving transistor T1, and the gate of the second transistor T8 is connected to the second control signal; wherein the driving transistor T1 can be, but is not particularly limited to, a polysilicon thin film transistor, and can also be specifically a low temperature polysilicon thin film transistor; and the first transistor T3 and the second transistor T8 can be, but not particularly limited to, both N-channel oxide thin film transistors, and can also be specifically metal oxide thin film transistors.

One of the source and the drain of the second transistor T8 is connected to another of the source and the drain of the first transistor T3, so that the display panel can better suppress the gate leakage current of the driving transistor T1 within one frame, and better maintain the gate potential of the driving transistor T1 and achieve low power consumption.

It can be understood that the first transistor T3 and the second transistor T8 is configured as N-channel oxide thin film transistors to further reduce the gate leakage current of the driving transistor T1 and reduce the power consumption of the display panel of this embodiment, so that the gate potential of the driving transistor T1 in the display panel is easier to maintain, which is beneficial for the display panel to work in both the first working state and the second working state.

The first control signal in this embodiment can be, but is not particularly limited to, the (N+1)th-level switch signal NScan(n+1) that is effective at high level; the second control signal can be, but is not particularly limited to, the N-level switching signal NScan(n) that is effective at high level.

The aforementioned pixel may further include a third transistor T4, one of the source and the drain of the third transistor T4 is connected to the initialization signal Vint, another of the source and the drain of the third transistor T4 is connected to one of the source and the drain of the second transistor T8, and the gate of the third transistor T4 is connected to a third control signal. It should be noted that the third transistor T4 can be, but is not particularly limited to, a polysilicon thin film transistor, and can also be specifically a low temperature polysilicon thin film transistor; configuring the third transistor T4 to be a P-channel type polysilicon thin film transistor can improve the dynamic performance of initialization, and the use of the second transistor T8 can reduce the leakage current of the driving transistor T1, thereby achieving high dynamic performance of the initialization loop and reducing the gate leakage current of the driving transistor T1.

The above-mentioned pixel may further include a first light-emitting control transistor T5 and a second light-emitting control transistor T6, one of the source and the drain of the first light-emitting control transistor T5 is connected to the first power signal ELVDD, and another of the source and the drain of the first light-emitting control transistor T5 is connected to another of the source and the drain of the driving transistor T1, the gate of the first light-emitting control transistor T5 is connected to the light-emitting control signal EM; one of the source and the drain of the second light-emitting control transistor T6 is connected to one of the source and the drain of the driving transistor T1, and the gate of the second light-emitting control transistor T6 is connected to the light-emitting control signal EM. The first light-emitting control transistor T5 and the second light-emitting control transistor T6 can be, but are not particularly limited to, polysilicon thin film transistors, can also be low temperature polysilicon thin film transistors, or can be P-channel thin film transistors.

As shown in FIG. 7, the above-mentioned pixel further includes a reset transistor T7, one of the source and the drain of the reset transistor T7 is connected to another of the source and the drain of the second light-emitting control transistor T6, another of the source and the drain of the reset transistor T7 is connected to another of the source and the drain of the third transistor T4, and the gate of the reset transistor T7 is connected to the third control signal.

The third control signal may be, but is not particularly limited to, the (N−1)th-level data writing control signal Scan(n−1).

As shown in FIG. 8, the above-mentioned pixel further includes a reset transistor T7, one of the source and the drain of the reset transistor T7 is connected to another of the source and the drain of the second light-emitting control transistor T6, another of the source and the drain of the reset transistor T7 is connected to the initialization signal Vint, and the gate of the reset transistor T7 is connected to the data writing control signal Scan(n). The reset transistor T7 may be, but not particularly limited to, a polysilicon thin film transistor, a low temperature polysilicon thin film transistor, or a P-channel thin film transistor.

The above-mentioned pixel may further include a writing transistor T2, one of the source and the drain of the writing transistor T2 is connected to the data signal Data, another of the source and the drain of the writing transistor T2 is connected to another of the source and the drain of the driving transistor T1, and the gate of the writing transistor T2 is connected to the data writing control signal Scan(n). Specifically, the writing transistor T2 may be, but not particularly limited to, a polysilicon thin film transistor, a low temperature polysilicon thin film transistor, or a P-channel type thin film transistor.

The above-mentioned display panel may further include a light-emitting device D1, an anode of the light-emitting device D1 is connected to one of the source and the drain of the reset transistor T7; a cathode of the light-emitting device D1 is connected to the second power signal ELVSS. The light-emitting device D1 can be, but is not particularly limited to, a Micro-LED, a Mini-LED, or an OLED.

The above-mentioned pixel may further include a storage capacitor C1, a first terminal of the storage capacitor C1 is connected to the first power signal ELVDD; a second terminal of the storage capacitor C1 is connected to the gate of the driving transistor T1.

Figure 9:
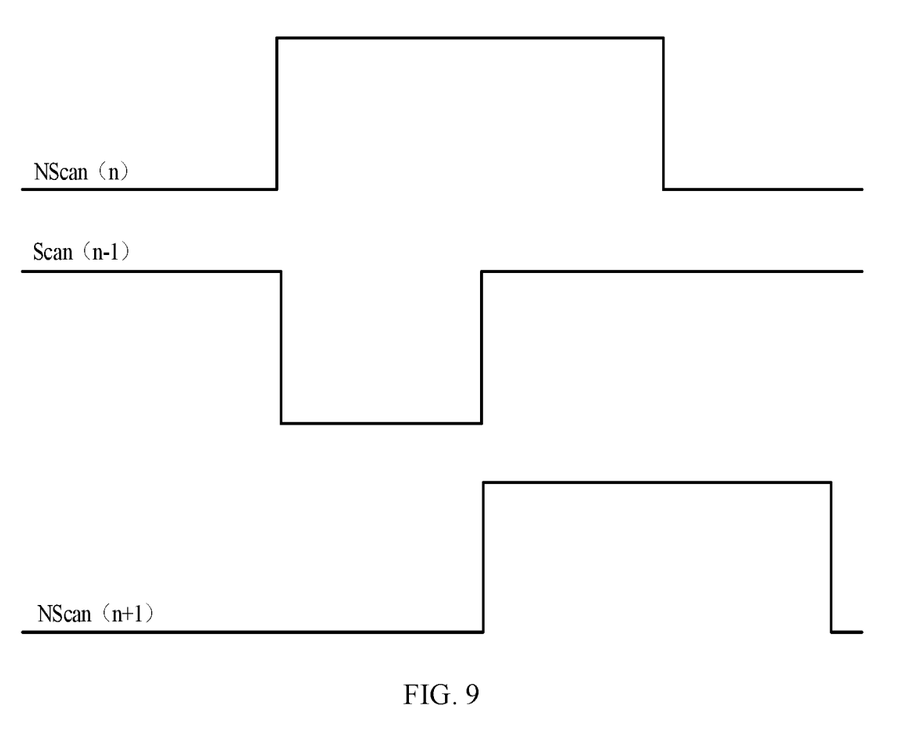
FIG. 9 is a timing diagram of corresponding signals in the pixels shown in FIG. 7 and/or FIG. 8.

As shown in FIG. 9, it should be explained that the falling edge of the (N−1)th-level data write control signal Scan(n−1) is present at the same time as the rising edge of the Nth-level switch signal NScan(n), which is effective at high level; the rising edge of the (N−1)th-level data writing control signal Scan (n−1) is present at the same time as the rising edge of the (N+1)th-level switching signal NScan (n+1) that is effective at high level; and the rising edge of the (N+1)th-level switch signal NScan(n+1) with effective at a high level is present between the rising edge and the falling edge of the Nth-level switch signal NScan(n), which is effective at a high level. The (N+1)th-level switching signal NScan(n+1) partially overlaps the Nth level switching signal NScan(n) that is effective at a high level.

In one of the embodiments, the present application provides a display device, which includes the display panel in any of the foregoing embodiments.

It is understandable that in the display panel provided in this embodiment, through improvement of the cascade connection between GOA units and the at least partially overlapping between working cycles of adjacent ones of the GOA units, more working cycles can be provided for the writing of the data signals to meet the writing requirements of the data signals during high-frequency drive display or ultra-high frequency drive display.

It can be understood that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display panel, comprising:
a gate driver on array (GOA) circuit comprising N cascaded GOA units, and an Nth-level one of the GOA units is cascaded with an N+X-level one of the GOA units;
a source driving chip having a plurality of output pins;
a multiplexing circuit comprising a plurality of multiplexing units, wherein each of the multiplexing units comprises an input terminal, a first output terminal, and a second output terminal, and one of the output pins is correspondingly connected to the input terminal; and
a plurality of pixels distributed in an array, wherein the first output terminal is correspondingly connected to odd-numbered rows of the pixels in a same column, and the second output terminal is correspondingly connected to even-numbered rows of the pixels in a same column,
wherein N and X are both integers greater than or equal to 2;
working cycles of adjacent ones of the GOA units at least partially overlap;
there is a first interval cycle between a working cycle of the Nth-level one of the GOA units and a working cycle of an N+2-level one of the GOA units;
each of the multiplexing units comprises a first transistor and a second transistor;
there is a second interval cycle between a working cycle of the first transistor and a working cycle of the second transistor; and
the working cycle of the first transistor, the second interval cycle, and the working cycle of the second transistor are in a same working cycle of one of the GOA units.

2. The display panel according to claim 1, wherein the first interval cycle is different from the second interval cycle.

3. The display panel according to claim 1, wherein the pixels comprise:
a driving transistor;
a first transistor, wherein one of a source and a drain of the first transistor is connected to a gate of the driving transistor, and the gate of the first transistor is connected to a first control signal; and
a second transistor, wherein one of a source and a drain of the second transistor is connected to another of the source and the drain of the first transistor, the another of the source and the drain of the second transistor is connected to one of the source and the drain of the driving transistor, and the gate of the second transistor is connected to a second control signal,
wherein the driving transistor is a polysilicon thin film transistor, and the first transistor and the second transistor are both oxide thin film transistors.

4. The display panel according to claim 3, wherein the pixels further comprise:
a third transistor, wherein one of a source and a drain of the third transistor is connected to an initialization signal, another of the source and the drain of the third transistor is connected to one of the source and the drain of the second transistor, and a gate of the third transistor is connected to a third control signal.

5. The display panel according to claim 4, wherein the pixels further comprise:
a first light-emitting control transistor, wherein one of a source and a drain of the first light-emitting control transistor is connected to a first power signal, another of the source and the drain of the first light-emitting control transistor is connected to another of the source and the drain of the drive transistor, and a gate of the first light-emitting control transistor is connected to the light-emitting control signal; and
a second light-emitting control transistor, wherein one of a source and a drain of the second light-emitting control transistor is connected to one of the source and the drain of the driving transistor, and a gate of the second light-emitting control transistor is connected to the light-emitting control signal.

6. The display panel according to claim 5, wherein the pixels further comprise:
a reset transistor, wherein one of a source and a drain of the reset transistor is connected to another of the source and the drain of the second light-emitting control transistor, another of the source and the drain of the reset transistor is connected to the initialization signal or another of the source and the drain of the third transistor, and a gate of the reset transistor is connected to the third control signal or a data writing control signal.

7. The display panel according to claim 6, wherein the pixels further comprise:
a writing transistor, wherein one of a source and a drain of the writing transistor is connected to a data signal, another of the source and the drain of the writing transistor is connected to another of the source and the drain of the driving transistor, and a gate of the writing transistor is connected to the data writing control signal.

8. A display device, comprising a display panel, wherein the display panel comprises:
a GOA circuit comprising N cascaded GOA units, and an Nth-level one of the GOA units is cascaded with an N+X-level one of the GOA units;
a source driving chip having a plurality of output pins;
a multiplexing circuit comprising a plurality of multiplexing units, wherein each of the multiplexing units comprises an input terminal, a first output terminal, and a second output terminal, and one of the output pins is correspondingly connected to the input terminal; and
a plurality of pixels distributed in an array, wherein the first output terminal is correspondingly connected to odd-numbered rows of the pixels in a same column, and the second output terminal is correspondingly connected to even-numbered rows of the pixels in a same column,
where N and X are both integers greater than or equal to 2;
working cycles of adjacent ones of the GOA units at least partially overlap;
there is a first interval cycle between a working cycle of the Nth-level one of the GOA units and a working cycle of an N+2-level one of the GOA units;
each of the multiplexing units comprises a first transistor and a second transistor;
there is a second interval cycle between a working cycle of the first transistor and a working cycle of the second transistor; and
the working cycle of the first transistor, the second interval cycle, and the working cycle of the second transistor are in a same working cycle of one of the GOA units according to claim 1.

9. The display device according to claim 8, wherein the pixels further comprise:
a storage capacitor, wherein a first terminal of the storage capacitor is configured to access a first power signal, and a second terminal of the storage capacitor is connected to the gate of the driving transistor.

10. The display device according to claim 9, wherein the pixels further comprise:
a light-emitting device, wherein an anode of the light-emitting device is connected to one of a source and a drain of a reset transistor; and a cathode of the light-emitting device is configured to access a second power signal.

11. The display device according to claim 8, wherein the first interval cycle is different from the second interval cycle.

12. The display device according to claim 8, wherein the pixels comprise:
a driving transistor;
a first transistor, wherein one of a source and a drain of the first transistor is connected to a gate of the driving transistor, and the gate of the first transistor is connected to a first control signal; and
a second transistor, wherein one of a source and a drain of the second transistor is connected to another of the source and the drain of the first transistor, the another of the source and the drain of the second transistor is connected to one of the source and the drain of the driving transistor, and the gate of the second transistor is connected to a second control signal;
wherein, the driving transistor is a polysilicon thin film transistor, and the first transistor and the second transistor are both oxide thin film transistors.

13. The display device according to claim 12, wherein the pixels further comprise:
a third transistor, wherein one of a source and a drain of the third transistor is connected to an initialization signal, another of the source and the drain of the third transistor is connected to one of the source and the drain of the second transistor, and a gate of the third transistor is connected to a third control signal.

14. The display device according to claim 13, wherein the pixels further comprise:
a first light-emitting control transistor, wherein one of a source and a drain of the first light-emitting control transistor is connected to a first power signal, another of the source and the drain of the first light-emitting control transistor is connected to another of the source and the drain of the drive transistor, and a gate of the first light-emitting control transistor is connected to the light-emitting control signal; and
a second light-emitting control transistor, wherein one of a source and a drain of the second light-emitting control transistor is connected to one of the source and the drain of the driving transistor, and a gate of the second light-emitting control transistor is connected to the light-emitting control signal.

15. The display device according to claim 14, wherein the pixels further comprise:
a reset transistor, wherein one of a source and a drain of the reset transistor is connected to another of the source and the drain of the second light-emitting control transistor, another of the source and the drain of the reset transistor is connected to the initialization signal or another of the source and the drain of the third transistor, and a gate of the reset transistor is connected to the third control signal or a data writing control signal.

16. The display device according to claim 15, wherein the pixels further comprise:
a writing transistor, wherein one of a source and a drain of the writing transistor is connected to a data signal, another of the source and the drain of the writing transistor is connected to another of the source and the drain of the driving transistor, and a gate of the writing transistor is connected to the data writing control signal.

* * * * *